US009460154B2

(12) United States Patent
Bellamkonda et al.

(10) Patent No.: US 9,460,154 B2
(45) Date of Patent: Oct. 4, 2016

(54) DYNAMIC PARALLEL AGGREGATION WITH HYBRID BATCH FLUSHING

(71) Applicant: Oracle International Corporation, Redwood Shores, CA (US)

(72) Inventors: Srikanth Bellamkonda, Mountain View, CA (US); Huagang Li, San Jose, CA (US)

(73) Assignee: Oracle International Corporation, Redwood Shores, CA (US)

( * ) Notice: Subject to any disclaimer, the term of this patent is extended or adjusted under 35 U.S.C. 154(b) by 203 days.

(21) Appl. No.: 13/705,004

(22) Filed: Dec. 4, 2012

(65) Prior Publication Data

US 2014/0156636 A1 Jun. 5, 2014

(51) Int. Cl.
*G06F 7/00* (2006.01)
*G06F 17/30* (2006.01)

(52) U.S. Cl.
CPC .............. *G06F 17/30489* (2013.01)

(58) Field of Classification Search
CPC ............ G06F 17/30967; G06F 17/30489; G06F 17/30324
USPC .............. 707/999.002, 999.003, 718, 720; 705/35; 370/260
See application file for complete search history.

(56) References Cited

U.S. PATENT DOCUMENTS

2006/0069632 A1* 3/2006 Kahn et al. ............... 705/35
2006/0116989 A1* 6/2006 Bellamkonda et al. ........ 707/3
2006/0182046 A1* 8/2006 Dageville et al. ........... 370/260

* cited by examiner

*Primary Examiner* — James Trujillo
*Assistant Examiner* — John J Morris
(74) *Attorney, Agent, or Firm* — Hickman Palermo Becker Bingham LLP

(57) ABSTRACT

A method, apparatus, and system for dynamic parallel aggregation with hybrid batch flushing are provided. Record sources of an aggregation operator in a query execution plan may dynamically aggregate using the same aggregation operator. The dynamic aggregation creates a batch of aggregation records from an input source, which are then used to aggregate further records from the input source. If a record from the input source is not matched to an aggregation record in the batch, then the record is passed to the next operator. In this manner, records are aggregated ahead of time at a record source to reduce the number of records passed between operators, reducing the impact of network I/O between nodes of a parallel processing system. By adjusting the contents of the batch according to aggregation performance monitored during run-time, hybrid batch flushing can be implemented to adapt to changing data patterns and skewed values.

20 Claims, 6 Drawing Sheets

202
Execute a query execution plan, the query execution plan including a first aggregation operator and a second aggregation operator that is a record source for the first aggregation operator, wherein the first aggregation operator and the second aggregation operator perform the same aggregation operation, and wherein executing the query execution plan comprises executing the second aggregation operator

204
Execute the second aggregation operator to generate an initial version of a batch of aggregation records

206
After generating the initial version of the batch of aggregation records, determine whether a first record may be aggregated with any aggregation record in the batch of aggregation records

208
In response to determining that the first record may not be aggregated with any aggregation record of the batch of aggregation records, sending the first record to the first aggregation operator

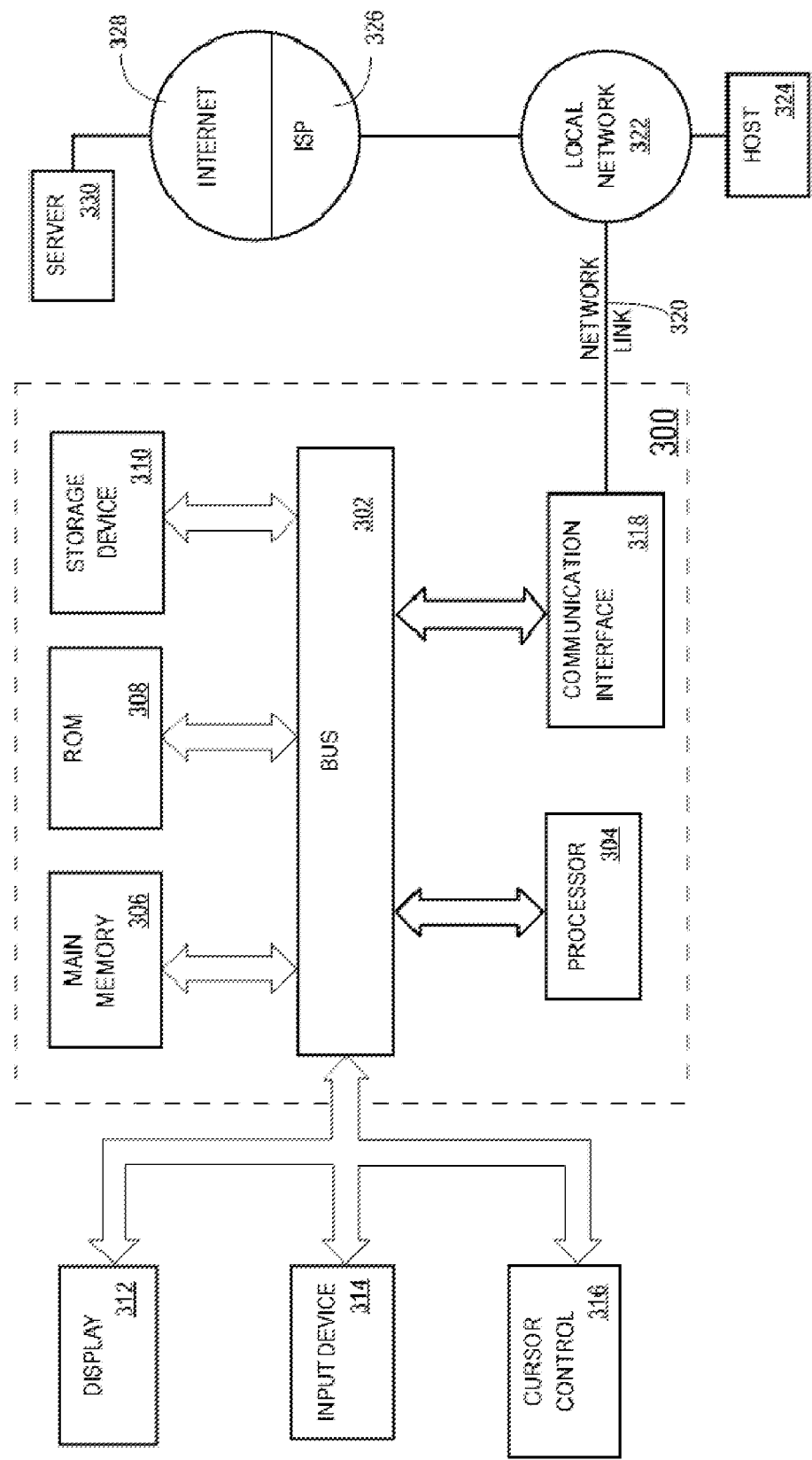

DYNAMIC PARALLEL AGGREGATION WITH HYBRID BATCH FLUSHING

FIELD OF THE INVENTION

The present disclosure relates to databases, and more specifically, to dynamic parallel aggregation with hybrid batch flushing.

BACKGROUND

Aggregation functions such as sums, counts, minimums, maximums and averages are often used as foundational analysis tools for data sets. For example, aggregation functions may be used on sales data to extract information and statistics such as total sales grouped by month, order counts grouped by day, or average order values for each customer. This information can be utilized by a company to track sales, evaluate policy, develop marketing strategy, project future growth, and perform various other tasks.

In a database context, aggregation operators such as sum, count, minimum, maximum and average can be calculated for a given set of records, which can be further grouped according to one or more key values such as order date or customer number. The desired aggregation operators and groupings can be specified in a database query, such as a SQL query.

Given the importance of aggregation functions for data analysis, providing a quick result for aggregation queries is often a key database performance metric. To answer aggregation queries in an accelerated fashion, the aggregation query can be formulated as a parallel operation when creating a query execution plan for execution by the database software.

In a typical parallelization approach, data to be aggregated may be processed by multiple record source processes, which distribute by key values to multiple aggregation operator processes. However, the distribution of the records to the aggregation operators introduces a significant bottleneck as the distribution may occur over a bandwidth-restricted and relatively high latency network connection. Bottlenecks may also arise from transfer overhead when shared memory or disk structures are used. These bottlenecks become especially acute when processing large numbers of records. Additionally, the above approach breaks down for records with skewed key values that distribute to a single process, precluding an effective parallelization of the workload.

Based on the foregoing, there is a need for developing a query execution plan that can process aggregation operators in a highly efficient and scalable fashion that can also accommodate skewed key values.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The present invention is illustrated by way of example, and not by way of limitation, in the figures of the accompanying drawings and in which like reference numerals refer to similar elements and in which:

FIG. 2 is a flow diagram that depicts a process for executing a query execution plan utilizing dynamic parallel aggregation, according to an embodiment;

FIG. 3 is a block diagram of a computer system on which embodiments may be implemented.

DETAILED DESCRIPTION

Figure 1A:
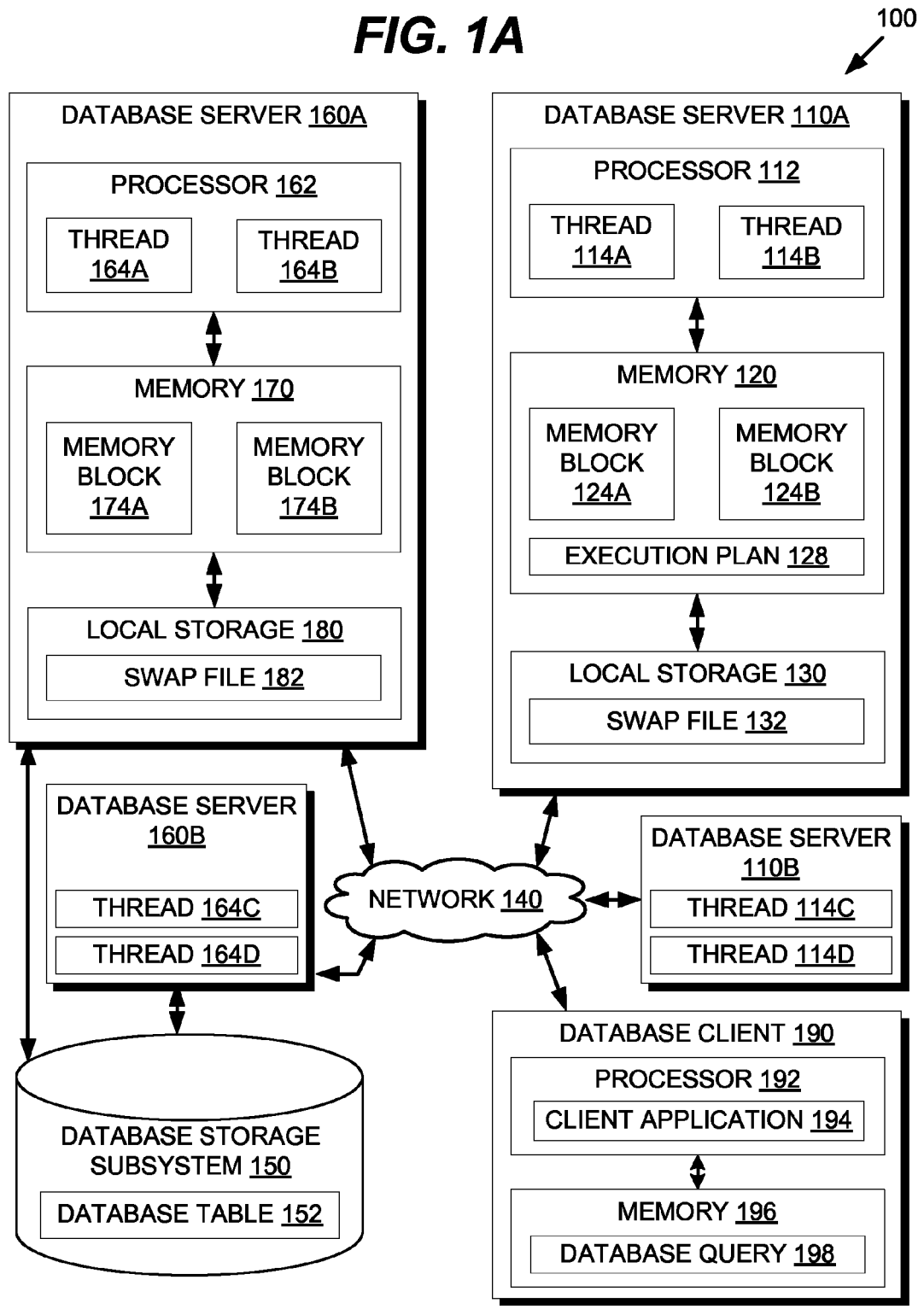
FIG. 1A is a block diagram that depicts an exemplary database system, according to an embodiment.

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Definitions

A "computing node", as the term is used herein, refers to a set of one or more processes (under control of an operating system) and a portion of memory and/or other computer resources, that are allocated for performance of one or more functionalities pursuant execution of software by said one or more processes. A computing node is also referred to herein as a node. A node includes a "server" or "server instance" that is configured to respond to requests from various clients and applications for one or more services and/or functionalities.

Examples of nodes include without limitation database servers that manage data in one or more databases, storage devices that store data persistently for database servers, multimedia server instances that manage various types of multimedia such as images, audio/video streams, and other streamed multimedia content, internet server instances that cache content that is persistently stored elsewhere, application server instances and other types of middleware server instances that cache data to service particular types of clients and applications, and any other types of instances that are configured to process persistently stored data by buffering it into a volatile memory cache.

An "execution plan" or "query execution plan", as the term is used herein, refers to a set of steps that are generated by a database system to execute a database query. Several candidate execution plans may be generated for a particular query, and a candidate execution plan estimated to be most efficient may be selected as the actual execution plan. The selection of an optimal candidate execution plan is beyond the scope of the present application and the selection of an efficient candidate execution plan will be assumed.

Execution plans may be represented by a graph of interlinked nodes, referred to herein as "operators", that each corresponds to a step of an execution plan, referred to herein as an execution plan operation. The hierarchy of the graphs represents the order in which the execution plan operations are performed and how data flows between each of the execution plan operations. Execution plan operations include, for example, an aggregation, a table scan, an index scan, hash-join, sort-merge join, nested-loop join, and filter.

A "record source", as the term is used herein, refers to an operator that produces a set of records when executed, for example by scanning the rows of a database table, or by performing an operation, such as a table join, on one or more inputs to create a new set of intermediate records. When a record source is defined for a particular operator, such as for an aggregation operator, then the record source is defined as an input for that particular operator.

General Overview

The approaches described herein provide an efficient way for a database server to process queries that require the evaluation of a group-by clause in a database query. This group-by clause is typically but not always in conjunction with an aggregation function. An aggregation function is one that takes multiple records and generates a single record for the multiple records. Example aggregation functions include SUM, COUNT, MIN, MAX, and AVG. A group-by clause, such as the SQL GROUP BY clause, groups the input according to a specified key or keys. By combining an aggregation function with a group-by clause, the aggregation function may be applied on each group. A query execution plan with multiple aggregation operators can be generated by the database server from such database queries.

To accelerate query processing, the query execution plan can be parallelized. For example, a record source for an aggregation operator may distribute records to multiple aggregation processes based on values such as hash values or key range divisions.

While parallel processing may accelerate the query execution plan, parallel processing may also introduce significant I/O and processing overhead from record passing between the operators in the query execution plan, especially for databases having numerous records. If a network is utilized for I/O between nodes, then the network can impose bandwidth and latency limitations as well. Moreover, significant amounts of memory may be required to hold the records between nodes. Available memory may be at a premium for consolidated and multi-user environments. If insufficient memory is available, undesirable swapping to disk storage may occur, incurring additional I/O overhead.

An aggregation optimizer estimator may be utilized to determine whether it is advantageous in terms of I/O and processor overhead reduction to perform additional aggregation at record sources of an aggregation operator. However, the estimator approach suffers from several shortcomings that can lead to inaccurate estimates and suboptimal results, as discussed in detail below under the "estimator drawbacks" heading.

Accordingly, dynamic parallel aggregation is proposed to reduce I/O overhead in a parallelized query execution plan. Record sources of an aggregation operator may be configured to dynamically aggregate using the same aggregation operator. The dynamic aggregation creates a batch of aggregation records from records in an input source, which are then used to aggregate further records from the input source. The batch may be populated unconditionally, by most frequent keys in a given sample, or created by any other criteria. The batch may be limited in maximum record size according to available memory, processor cache size, or other criteria. The batch may be implemented as a hash table on aggregation keys for record matching in constant time. If a record from the input source is not matched to an aggregation record in the batch, then the record is passed as-is to the next aggregation operator.

In this manner, records are aggregated ahead of time at a record source of an aggregation operator to reduce the number of records passed between operators, reducing the impact of bandwidth-limited and high-latency network links between nodes, and reducing transfer overhead for shared memory or disk structures. By limiting the size of the batch, the memory and cache footprint of the dynamic aggregation may be minimized, and I/O expensive disk swapping may be avoided. Moreover, because the number of records is reduced in advance, less memory is correspondingly required for the node executing the aggregation operator.

Hybrid Batch Flushing

The specific number of records reduced at a record source may be monitored and tracked at runtime, and batch flushing may be applied if the reduction falls below a certain performance threshold. When the batch is flushed, the contents of the batch are passed to the next operator, the batch is cleared, and a new batch is created from records in the input source. The batch flushing algorithm described above combined with the passing of non-matched records as-is to the next operator may be referred to collectively as "hybrid batch flushing", particularly when the batch size is limited by available memory.

If a sustained period of low record reduction performance is observed for a record source of an aggregation operator, then the dynamic aggregation may also be disabled temporarily or completely to reduce processing overhead. Accordingly, the dynamic aggregation can adapt to changing data patterns and can be disabled when dynamic aggregation provides insufficient optimization benefits to outweigh the processing overhead.

Accordingly, the use of dynamic aggregation with hybrid batch flushing enables the generation of query execution plans that can aggregate in parallel with lower I/O overhead, readily scaling to large numbers of records and responsive to the actual data records being processed at runtime. As a result, database software can scale to large numbers of processors, nodes, and servers to provide rapid turnaround for database aggregation queries.

System Overview

FIG. 1A is a block diagram that depicts an exemplary database system, according to an embodiment. Database system 100 of FIG. 1A includes database server 110A, database server 110B, network 140, database storage subsystem 150, database server 160A, database server 160B, and database client 190. Database server 110A includes processor 112, memory 120, and local storage 130. Processor 112 includes thread 114A and 114B. Memory 120 includes memory block 124A, memory block 124B, and execution plan 128. Local storage 130 includes swap file 132. Database server 110B includes thread 114C and thread 114D. Database storage subsystem 150 includes database table 152. Database server 160A includes processor 162, memory 170, and local storage 180. Processor 162 includes thread 164A and thread 164B. Memory 170 includes memory block 174A and memory block 174B. Local storage 180 includes swap file 182. Database server 160B includes thread 164C and thread 164D.

Database servers 110A-110B and database servers 160A-160B are multi-node systems, each comprising any multiple number of nodes. Threads 114A-114B may be referred to as consumers, whereas threads 164A-164B may be referred to as producers. Multiple nodes may be assigned to the same operator, which may also execute in parallel on multiple threads or processes. Embodiments of the present invention are illustrated using multi-node systems, however an embodiment of the present invention is not so limited. Additionally, while the Figures are shown to use threads for parallelism, alternative embodiments may use processes as well.

While only a single database client 190 is shown, embodiments of database system 100 may support multiple database clients concurrently. Additionally, while only a single database table 152 is shown in database storage subsystem 150, embodiments may also include multiple database tables, and database query 198 may address multiple database tables in a single query. Embodiments of database system 100 may also include any desired quantity of database servers and database storage subsystems. While not shown in FIG. 1A, each database storage subsystem may also include database storage servers for interfacing with the stored database data, such as database table 152. The database storage subsystems can provide row retrieval and simple non-buffered processing including non-aggregation operations and filters. On the other hand, the database servers 110A, 110B, 160A, and 160B can provide more complex buffered processing including aggregation operations. For simplicity, database server 110B and database server 160B are shown in abbreviated form in FIG. 1A. However, database server 110B may contain elements similar to those shown in database server 110A, and database server 160B may contain elements similar to those shown in database server 160A.

Client application 194 executing on processor 192 of database client 190 may be directed towards various database applications including web services, data transactions, data mining, high-performance computing (HPC), and other applications. A database query 198 may be generated at client application 194 as a SQL query for execution on database table 152, and the query may be routed to an available database server, such as database server 110A. In response, database server 110A may generate a corresponding execution plan 128, which may be executed in parallel over available threads on database servers 160A-160B and database servers 110A-110B. As shown in database system 110, each thread 114A, 114B, 164A, and 164B may allocate a corresponding memory block 124A, 124B, 174A, and 174B, respectively. If insufficient memory is available, then virtual memory may be utilized via swap files 132 and 182 of local storage 130 and 180, respectively. However, as discussed below, execution plan 128 may be structured to avoid swapping to local storage.

Aggregation Optimizer Estimator

Figure 1B:
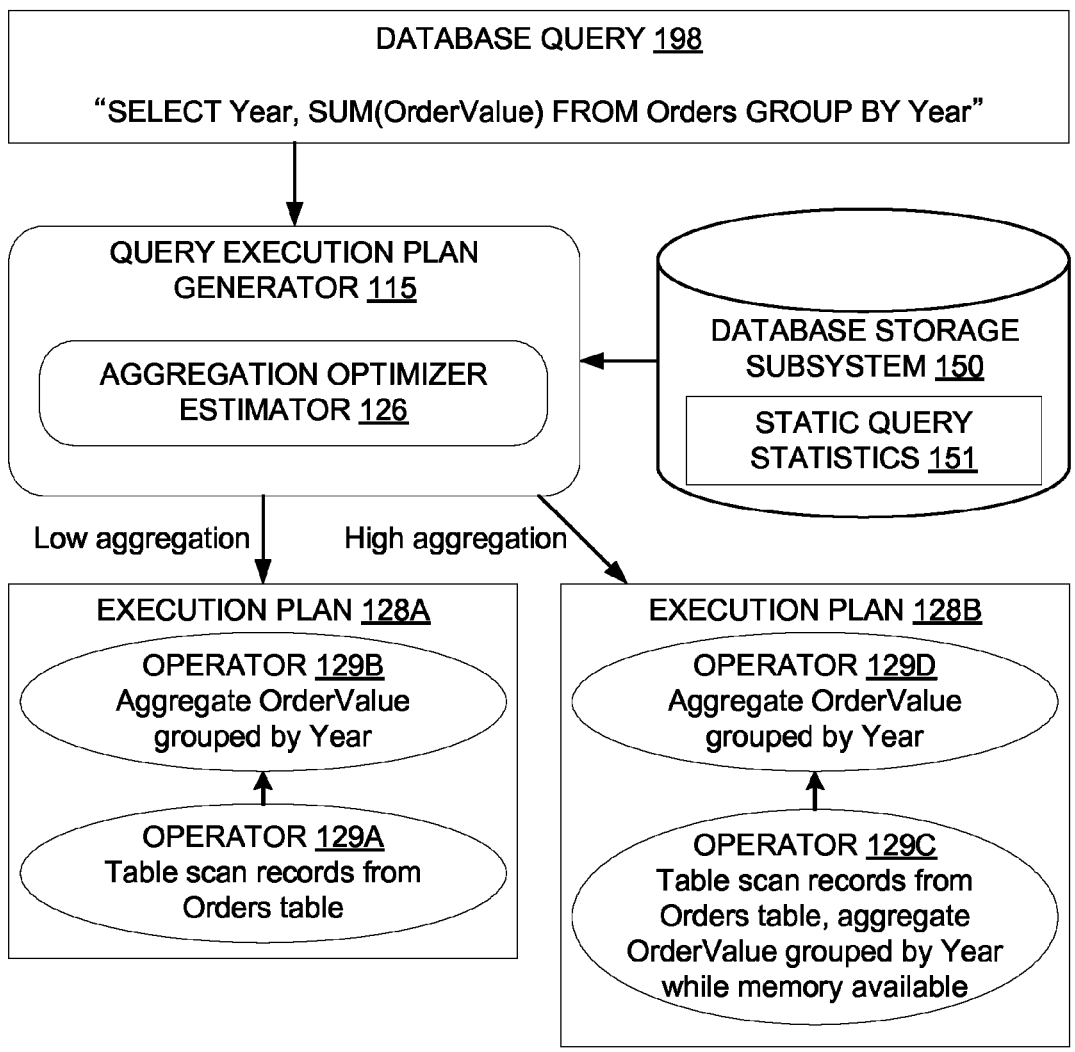
FIG. 1B is a block diagram that depicts the generation of exemplary query execution plans using an aggregation optimizer estimator.

FIG. 1B is a block diagram that depicts the generation of exemplary query execution plans using an aggregation optimizer estimator. Diagram 101 of FIG. 1B includes query execution plan generator 115, execution plan 128A, execution plan 128B, database storage subsystem 150, and database query 198. Query execution plan generator 115 includes aggregation optimizer estimator 126. Database storage subsystem 150 includes static query statistics 151. Execution plan 128A includes operator 129A and operator 129B. Execution plan 128B includes operator 129C and operator 129D. With respect to FIG. 1B, like numbered elements may correspond to the same elements from FIG. 1A.

In diagram 101 of FIG. 1B, a database query 198, which includes an aggregation function, is provided for processing by database system 100 of FIG. 1A. Database query 198 is carried out on the Orders table, which may be stored in database table 152 of FIG. 1A. Specifically, database query 198 is structured as a SQL statement that requests a table having two columns: 1) Year, and 2) a sum of OrderValues for that Year. In this manner, a user can determine the total sales for each year.

As shown in FIG. 1B, the database query 198 is processed through a query execution plan generator 115. An intermediate execution plan may result, which is further processed through aggregation optimizer estimator 126. Aggregation optimizer estimator 126 may modify the intermediate execution plan based on the estimated number of records that can be aggregated. In the case of a low aggregation estimate, an unmodified execution plan 128A is provided, where aggregation is only carried out at the original aggregation operator of the intermediate execution plan, or operator 129B. In the case of high aggregation, a modified execution plan 128B is provided, where additional aggregation is carried out on operators for record sources of the aggregation operator, or operator 129C, at least while memory is available.

It may be noted that database query 198 only contains a single aggregation function for simplicity. However, database query 198 may also include multiple aggregation functions, which may be evaluated individually by aggregation optimizer estimator 126. Additionally, it can be observed that the intermediate execution plan shown in execution plan 128A is a simple two-node plan where a table scan operator is a record source for an aggregation operator. However, the methods and procedures discussed in the present application are generally applicable for aggregation operators of any execution plan, regardless of complexity or specific structure. Thus, a record source for an aggregation operator is not restricted to a table scan and could be another operator such as a table join or even another aggregation operator.

Estimator Drawbacks

Aggregation optimizer estimator 126 uses static query statistics 151 from database storage subsystem 150 to estimate the level of aggregation that may be expected from database query 198. Static query statistics 151 may include data concerning prior queries against database table 152 and the level of aggregation observed for various key values. However, since static query statistics 151 is based on past data and may be updated on an infrequent periodic basis, static query statistics 151 may reflect an outdated and stale model of the actual data records stored in database table 152 of database storage subsystem 150. Since the estimator does not take into account the actual data records being processed, data sets with skewed values are not estimated correctly. Moreover, because many combinations of keys are possible for aggregation, particularly for more complex database queries, the data available in static query statistics 151 may not directly address the specific aggregation functions requested in database query 198. While aggregation optimizer estimator 126 may sample actual data in database storage subsystem 150 to provide an estimate, a data sampling approach by nature tends to have high computational costs and limited accuracy, particularly for more complex database queries. As a result, the estimated level of aggregation from aggregation optimizer estimator 126 may be inaccurate, precluding correct optimization of execution plans.

Furthermore, as shown in operator 129C, the additional aggregation only continues while memory is available, and is simply disabled when encountering a low or out-of-memory condition. In this case, the existing aggregated records may be flushed to operator 129D, and operator 129C may continue to table scan records from the Orders table without any additional aggregation, essentially functioning the same as operator 129A. This reflects the high priority of avoiding disk swapping to local storage, which carries a high I/O penalty. However, when high levels of aggregation are still possible with a given record source, the complete disabling of the additional aggregation may sacrifice significant optimization benefits. Thus, the decision to stop additional aggregation based on available memory can lead to suboptimal performance.

Dynamic Parallel Aggregation Execution Plan

Figure 1C:
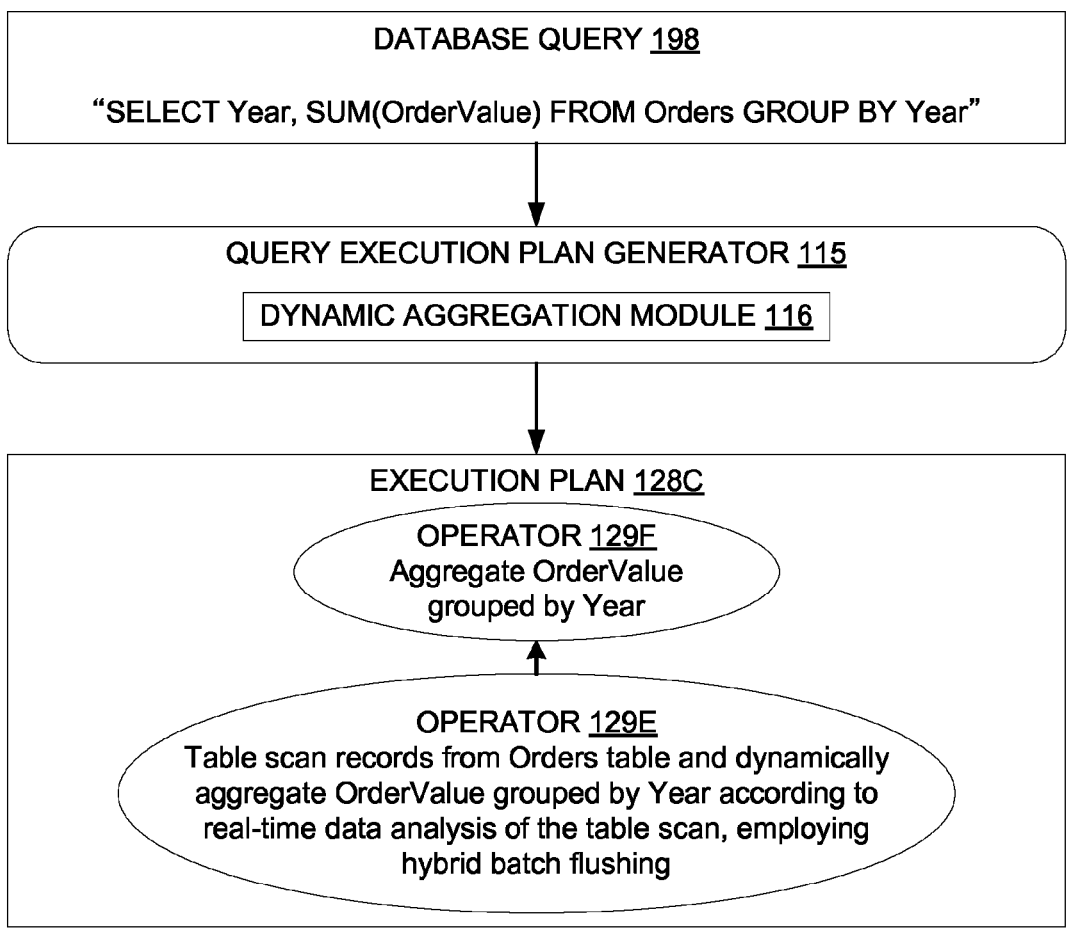
FIG. 1C is a block diagram that depicts the generation of an exemplary query execution plan utilizing dynamic parallel aggregation with hybrid batch flushing, according to an embodiment.

Accordingly, to overcome the shortcomings of the aggregation optimizer estimator approach, a dynamic parallel aggregation approach is introduced. FIG. 1C is a block diagram that depicts the generation of an exemplary query execution plan utilizing dynamic parallel aggregation with hybrid batch flushing, according to an embodiment. Diagram 102 of FIG. 1C includes database query 198, query execution plan generator 115, and execution plan 128C. Query execution plan generator 115 includes dynamic aggregation module 116. Execution plan 128C includes operator 129E and operator 129F. With respect to FIG. 1C, like numbered elements may correspond to the same elements from FIG. 1B.

As shown in FIG. 1C, the aggregation optimizer estimator 126 of FIG. 1B is completely omitted, removing the reliance on static and outdated statistics such as static query statistics 151. Instead, dynamic aggregation module 116 modifies the execution plan generated by query execution plan generator 115 such that record sources for aggregation operators dynamically aggregate using the same aggregation operator, employing hybrid batch flushing to handle low aggregation/reduction or out-of-memory conditions. Thus, as shown in execution plan 128C, the record source or operator 129E is modified to dynamically aggregate OrderValue grouped by Year, which is the same aggregation operator as operator 129F. As described in operator 129E, the dynamic aggregation is based on real-time data analysis of the input source: a table scan of the Orders table in database table 152. Thus, the dynamic parallel aggregation is able to optimize using the actual data records read during run-time rather than relying on outdated static data, as in the estimation approach described above with FIG. 1B. Additionally, operator 129E employs hybrid batch flushing, as briefly outlined in the above "hybrid batch flushing" heading and as discussed in greater detail below under the "hybrid batch flushing operation" heading.

Dynamic Parallel Aggregation Operation

To understand the operation and data flow of database system 100 using execution plan 128C from FIG. 1C, it may be instructive to review the processing of a specific query with data structures populated with example data. Accordingly, turning to FIG. 1D, diagram 103 of FIG. 1D includes execution plan 128C, operator 129E, operator 129F, block 142, block 144, block 146, database table 152, batch of aggregation records 154, and database query 198. With respect to FIG. 1D, like numbered elements may correspond to the same elements from FIG. 1C and FIG. 1A.

Additionally, FIG. 2 is a flow diagram that depicts a process for executing a query execution plan utilizing dynamic parallel aggregation with hybrid batch flushing, according to an embodiment. Process 200 of FIG. 2 includes block 202, block 204, block 206, and block 208. At block 202, referring to FIG. 1A, processor 112 executes execution plan 128, corresponding to execution plan 128C of FIG. 1C, including a first aggregation operator, or operator 129F, and a second aggregation operator, or operator 129E, that is a record source for operator 129F. While operator 129E may have originally been a simple table scan operator in an intermediate execution plan, the addition of dynamic aggregation module 116 in FIG. 1C results in operator 129E being modified into an aggregation operator, or more specifically a dynamic aggregation operator. Operator 129F and 129E perform the same aggregation operation, or the summing of the OrderValue grouped by Year. As operator 129E must be executed before operator 129F, the execution of execution plan 128C must proceed by first executing the second aggregation operator, or operator 129E.

Parallelizing the Execution Plan

Before Discussing The actual execution operator 129E, it may be instructive to overview a general process for parallelizing an execution plan. To parallelize the execution of execution plan 128C, referring to FIG. 1A, database server 110A may distribute operators 129E-129F for execution on multiple computing devices, including database servers 110A-110B and database servers 160A-160B. Thus, operator 129F is executed on a first plurality of computing devices, or database servers 110A-110B, while operator 129E is executed on a second plurality of computing devices, or database servers 160A-160B. The number of threads and computing devices reserved may depend on available server resources and the complexity of the execution plan. The negotiation, creation, and assignment of server threads, memory blocks, and other resources may be through a centralized scheduler, by peer-to-peer communication, or by other methods, which are not specifically shown in FIG. 1A.

For example, thread 164A on database server 160A and thread 164C on database server 160B may be assigned to perform operator 129E in parallel, for example by dividing the table scan of the Orders table in database table 152 into two table scan ranges. Similarly, thread 114A on database server 110A and thread 114C on database server 110B may be assigned to perform operator 129F in parallel. As previously described, threads 164A and 164C may distribute records to threads 114A and 114C according to key ranges. Threads 164B, 164D, 114B, and 114D may be assigned to service other database queries. While each computing device in FIG. 1A is shown to have only two threads, the number of available threads may be set based on available processing resources, for example the number of cores on processor 112 or 162. As previously described, processes may also be used instead of threads.

In one example key range distribution, thread 114A receives records that have a key or Year prior to 2000, whereas thread 114C receives records that have a key or Year of 2000 and above. The key distribution may also use other values, such as hash values. Since threads 114A and 114C can aggregate their respective key ranges independently, threads 114A and 114C can proceed in parallel. After threads 114A and 114C complete, then their respective aggregation results are combined to answer the original database query 198.

Figure 1D:
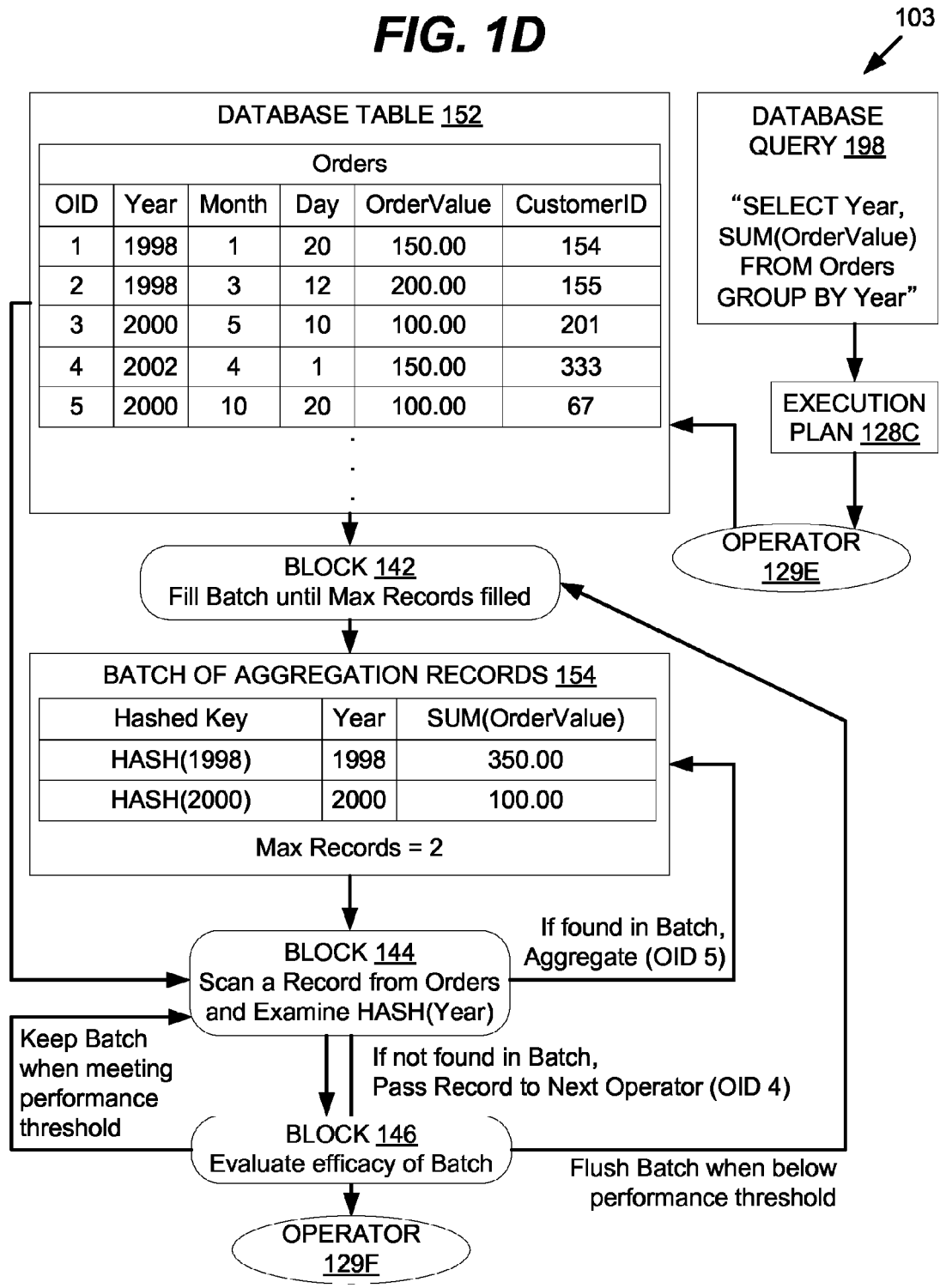
FIG. 1D is a flow diagram that depicts exemplary data structures for executing a query execution plan utilizing dynamic parallel aggregation with hybrid batch flushing, according to an embodiment.

Returning to the actual execution of operator 129E, referring to FIG. 1D, block 202 can be applied using the example data present in database table 152. For simplicity, FIG. 1D omits the details of parallel processing, which have already been described above in conjunction with FIG. 1A. As previously discussed, the execution of execution plan 128C must proceed by first executing the second aggregation operator, or operator 129E. Operator 129E is thus carried out on database table 152, which includes several records in the Orders table, of which 5 are shown in FIG. 1D. For simplicity, the Year, Month, and Day columns in the Orders table are shown as separate integer columns rather than as a single date or timestamp column.

Populating a Batch of Aggregation Records

At block 204 of FIG. 2, referring to FIG. 1D, operator 129E is executed to generate an initial version of the batch of aggregation records 154. This may be carried out by executing block 142 in FIG. 1D, where the batch of aggregation records 154 is filled from records in the input source, or database table 152, until the maximum number of records is reached. To keep the example in diagram 103 manageable, the maximum number of records is set to a low value of 2 records. However, the maximum number of records may be set depending on available memory, the cache size of the processor, or by other criteria.

The strategy of block 142 in FIG. 1D is simply to fill the batch of aggregation records 154 until full. The aggregation records are also aggregated while filling or preparing the batch. The batch of aggregation records 154 may be structured as a hash table using the aggregation key, or Year, as the hash table key. Accordingly, operations on the batch of aggregation records 154 can be carried out in constant time. While a hash table is used in the following example, any suitable data structure may also be utilized.

Thus, walking through the Orders table in database table 152, at OID 1, a hash function HASH( ) is applied to the key or Year value 1998. Since the index HASH(1998) does not yet exist in the batch of aggregation records 154, a new record is inserted in the batch of aggregation records 154 containing the column values requested by the original database query 198, or "Year" and "SUM(OrderValue)". After processing OID 1, the batch of aggregation records 154 has a single record with an index=HASH(1998) and column values of Year=1998 and SUM(OrderValue)= 150.00.

Next, at OID 2, the hash function HASH( ) is again applied to the key or Year value 1998. When looking up HASH(1998), it can be observed that there is an existing record at the batch of aggregation records 154 since a record already exists at index=HASH(1998). An existing record indicates that the aggregation function needs to be carried out on the existing aggregation record and the new record to be added. Since the aggregation function in this case is a SUM function, the aggregation can be resolved by adding the values of the columns to be aggregated, in this case the OrderValue for OID=1 and OID=2, or 150.00 and 200.00. For other aggregation functions such as averages and counts, the relevant aggregation function may be carried out for the columns in the existing record and the new record. In any case, after processing OID 2, the batch of aggregation records 154 has a single record with an index=HASH(1998) and updated column values of Year=1998 and SUM(Order-Value)=350.00.

Next, at OID 3, the hash function HASH( ) is again applied to the key or Year value 2000. Since the index HASH(2000) does not yet exist in the batch of aggregation records 154, a new record is inserted in the batch of aggregation records 154. After processing OID 3, the batch of aggregation records 154 appears as shown in FIG. 1D. Since the number of records in the batch of aggregation records 154 has reached the maximum number of records, or 2, block 142 is now completed. However, as previously discussed, other strategies can also be utilized to fill the batch of aggregation records 154, such as by a frequency of keys for a given sample of input records.

Aggregation Using the Batch

At block 206 of FIG. 2, referring to FIG. 1D, after the batch of aggregation records 154 is generated in block 204, block 144 can now determine whether a first record may be aggregated with any aggregation record in the batch of aggregation records 154. Since OID 1, 2, and 3 have already been read to form the batch of aggregation records 154 in block 142, the "first record" of block 206 refers to the first record not yet scanned in database table 152, or OID 4. Since the batch of aggregation records 154 is structured as a hash table, a lookup for an existing index on HASH(Year) can determine whether OID 4 may be aggregated. In the case of OID 4, the batch of aggregation records 154 can be examined to see if an index of HASH(2002) exists. Since such an index does not exist, the first record cannot be aggregated with any aggregation record in the batch of aggregation records 154.

When aggregation is not possible with the batch of aggregation records 154, the process 200 in FIG. 2 proceeds to block 208, where the first record or OID 4 is sent to the first aggregation operator, or operator 129F. Accordingly, any records that cannot aggregate within the existing batch of aggregation records 154 are bypassed to operator 129F for aggregation at a later time in the execution plan 128C. In this manner, the batch of aggregation records 154 can be constricted to a fixed size, avoiding low or out-of-memory conditions that may trigger undesirable swapping to disk or local storage.

When aggregation is possible with the batch of aggregation records 154, as with OID 5, then it is simply aggregated with the existing record, similar to the procedure already discussed above with respect to block 204.

Hybrid Batch Flushing Operation

Additionally, while not specifically shown in process 200, hybrid batch flushing may also be implemented, as shown in block 146 of FIG. 1D. Besides using block 144 to bypass records that cannot aggregate into the batch, block 146 may also be invoked to monitor and evaluate the efficacy of the batch of aggregation records 154 in reducing the number of records that are eventually passed to operator 129F due to the dynamic aggregation. A performance threshold may be defined where a certain level of record reduction is sufficient to overcome the processing overhead of dynamic aggregation. To reduce the effect of outlier data, the performance threshold may be evaluated as an average over time. When the performance threshold is met, the same batch of aggregation records 154 may be kept as-is.

However, when the performance threshold is not reached, then the initial version of the batch of aggregation records 154 may be flushed to the next operator. To flush, the records in the batch of aggregation records 154 are first passed to the next operator, or operator 129F. Next, the batch of aggregation records 154 is cleared, and the maximum number of records may be adjusted if necessary. A reserved portion of the batch of aggregation records 154 may be kept intact, skipping the above flushing. For example, if the batch is filled on the basis of key frequency, then the top 10% of the batch of aggregation records 154 having the highest key frequency may be the reserved portion, and the remaining 90% may be flushed as discussed above. While the top 10% is used as an example, any threshold may be used. Next, block 142 is invoked again to refill the batch of aggregation records 154 with new data while preserving any reserved portion. Additional records from database table 152 are now compared to the newly refreshed version of the batch of aggregation records 154, and the performance of the new version of the batch is continuously evaluated using block 146, just as with the initial version. In this manner, the dynamic aggregation can react and adjust to changing patterns of data in database table 152. Skewed values are also automatically taken into consideration by nature of the hybrid batch flushing operation.

Dynamic Aggregation Disabling and Trial Period

In some cases, the data in database table 152 may not be amenable to dynamic aggregation, and the overhead of dynamic aggregation may outweigh any advantages provided. To account for these cases, the dynamic aggregation may be completely disabled if block 146 detects a sufficiently low reduction in records. This disabling functionality may be incorporated into block 146 of FIG. 1D.

It may be inefficient to disable the dynamic aggregation too quickly based on a small sampling of database table 152. To mitigate this problem, the disabling of the dynamic aggregation may be through a "trial period", where at least a set number of successive batches of aggregation records 154 are tested and flushed for sustained low performance. Once the trial period exceeds the set number of successive batches, then the dynamic aggregation may be fully disabled at operator 129E, and associated reserved memory may be freed. Otherwise, dynamic aggregation may continue if the performance threshold is reached anytime during the trial period.

Since the disabling of the dynamic aggregation is motivated in part by processing overhead, the trial period may be configured for minimal processing overhead. Thus, within the trial period, the maximum records of the batch of aggregation records 154 may be reduced in number to free memory resources for other threads. To further reduce processing and memory I/O overhead, the maximum records may also be limited based on the ability to execute a thread for the trial period within a cache, such as a L2 cache of a processor.

Thus, the use of dynamic parallel aggregation as described above provides optimized execution of query execution plans for database queries using aggregation functions. Since the dynamic parallel aggregation determines to aggregate based on the actual data records being processed at run-time, the query execution plan can operate in a highly optimized fashion appropriate for the actual data being processed. Additionally, the use of estimators relying on static data of past executions can be entirely avoided, bypassing the various drawbacks inherent in such estimators. By using hybrid batch flushing as described above, the dynamic parallel aggregation can adapt to changing data patterns and accommodate skewed values. Processing overhead of the dynamic parallel aggregation including thread processing load, memory I/O, and memory usage can be minimized by appropriately limiting the maximum records for the batch of aggregation records. Furthermore, the dynamic parallel aggregation may be disabled completely if insufficient optimization benefit is provided, which may be triggered after conducting a trial period of consecutive batch flushes having sustained low performance. Additionally, at the cost of some additional overhead, the batch may alternatively fill with the most frequently occurring key values rather than being filled on a simple first-come first-serve basis.

Database Systems

A database management system ("DBMS") manages a database. A database management system may comprise one or more database servers. A database comprises database data and metadata that is stored on a persistent memory mechanism, such as a set of hard disks. Database data may be stored in one or more data containers. Each container contains records. The data within each record is organized into one or more fields. In relational database management systems, the data containers are referred to as tables, the records are referred to as rows, and the fields are referred to as columns. In object-oriented databases, the data containers are referred to as object classes, the records are referred to as objects, and the fields are referred to as attributes. Other database architectures may use other terminology.

Database applications and clients interact with a database server by submitting to the database server commands that cause the database server to perform operations on data stored in a database. A database command may be in the form of a database statement that conforms to database language statement. A language for expressing the database requests is the Structured Query Language (SQL). There are many different versions of SQL, some versions are standard and some proprietary, and there are a variety of extensions. SQL data definition language ("DDL") instructions are issued to a database server to create or configure database objects, such as tables, views, or complex data types. SQL/XML is a common extension of SQL used when manipulating XML data in an object-relational database. Although the examples are described based on Oracle's SQL, the techniques provided herein are not restricted to any particular version of SQL.

A multi-node database management system is made up of interconnected nodes that share access to the same database. Typically, the nodes are interconnected via a network and share access, in varying degrees, to shared storage, e.g. shared access to a set of disk drives and data blocks stored thereon. The nodes in a multi-node database system may be in the form of a group of computers (e.g. work stations, personal computers) that are interconnected via a network. Alternately, the nodes may be the nodes of a grid. A grid is composed of nodes in the form of server blades interconnected with other server blades on a rack.

Each node in a multi-node database system hosts a database server. A server, such as a database server, is a combination of integrated software components and an allocation of computational resources, such as memory, a node, and processes on the node for executing the integrated software components on a processor, the combination of the software and computational resources being dedicated to performing a particular function on behalf of one or more clients.

Resources from multiple nodes in a multi-node database system can be allocated to running a particular database server's software. Each combination of the software and allocation of the resources from a node is a server that is referred to herein as a "server instance" or "instance".

Hardware Summary

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

For example, FIG. 3 is a block diagram that illustrates a computer system 300 upon which an embodiment of the invention may be implemented. Computer system 300 includes a bus 302 or other communication mechanism for communicating information, and a hardware processor 304 coupled with bus 302 for processing information. Hardware processor 304 may be, for example, a general purpose microprocessor.

Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Such instructions, when stored in storage media accessible to processor 304, render computer system 300 into a special-purpose machine that is customized to perform the operations specified in the instructions.

Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

Computer system 300 may implement the techniques described herein using customized hard-wired logic, one or more ASICs or FPGAs, firmware and/or program logic which in combination with the computer system causes or programs computer system 300 to be a special-purpose machine. According to one embodiment, the techniques herein are performed by computer system 300 in response to processor 304 executing one or more sequences of one or more instructions contained in main memory 306. Such instructions may be read into main memory 306 from another storage medium, such as storage device 310. Execution of the sequences of instructions contained in main memory 306 causes processor 304 to perform the process steps described herein. In alternative embodiments, hard-wired circuitry may be used in place of or in combination with software instructions.

The term "storage media" as used herein refers to any media that store data and/or instructions that cause a machine to operation in a specific fashion. Such storage media may comprise non-volatile media and/or volatile media. Non-volatile media includes, for example, optical or magnetic disks, such as storage device 310. Volatile media includes dynamic memory, such as main memory 306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 302. Transmission media can also take the form of acoustic or light waves, such as those generated during radio-wave and infra-red data communications.

Various forms of media may be involved in carrying one or more sequences of one or more instructions to processor 304 for execution. For example, the instructions may initially be carried on a magnetic disk or solid state drive of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card, cable modem, satellite modem, or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are example forms of transmission media.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method, comprising steps of:
   executing a query execution plan, said query execution plan including a first aggregation operator and a second aggregation operator that is a record source for said first aggregation operator, wherein said first aggregation operator and said second aggregation operator perform a same aggregation operation;
   wherein executing the second aggregation operator comprises:
      generating an initial version of a batch of aggregation records based on a first set of records from an input source;
      determining that one or more second records from the input source may not be aggregated with any existing aggregation record of said batch of aggregation records, and in response, sending the one or more second records to said first aggregation operator without updating said batch of aggregation records; and
      sending the batch of aggregation records to the first aggregation operator;
   wherein executing the first aggregation operator comprises aggregating aggregation records and second records received from the second aggregation operator;
   wherein the method is performed by one or more computing devices.

2. The method of claim 1, wherein the executing of the second aggregation operator further comprises:
   monitoring a number of records reduced by aggregating with said batch of aggregation records;
   determining that said number of records reduced is under a performance threshold;
   flushing the batch of aggregation records by sending the batch of aggregation records to said first aggregation operator; and
   generating a refreshed version of said batch of aggregation records based on another set of records from the input source.

3. The method of claim 2, wherein said number of records reduced is calculated as an average over time.

4. The method of claim 2, wherein the executing of the second aggregation operator further comprises:
   monitoring a number of successive occurrences of said flushing; and
   disabling aggregation at said second aggregation operator in response to said number of successive occurrences exceeding a set number.

5. The method of claim 2, wherein flushing the batch of aggregation records comprises reserving a portion of said batch of aggregation records, and wherein said generating of said refreshed version of said batch of aggregation records preserves said portion.

6. The method of claim 1, wherein said first aggregation operator is performed by a first plurality of said one or more computing devices, and wherein said second aggregation operator is performed by a second plurality of said one or more computing devices.

7. The method of claim 1, wherein each aggregation record in the initial batch of aggregation records corresponds to an aggregation key value of one or more records in the first set of records.

8. The method of claim 7, wherein generating the initial version of the batch of aggregation records comprises using a frequency of aggregation key values of said same aggregation operation in said input source to populate said initial version of said batch of aggregation records.

9. The method of claim 1, wherein said initial version of said batch of aggregation records is limited to a maximum number of records.

10. The method of claim 9, wherein said maximum number of records is based on available memory of said one or more computing devices.

11. The method of claim 9, wherein said maximum number of records is based on available processor cache of said one or more computing devices.

12. The method of claim 1, wherein said batch of aggregation records is stored in a hash table.

13. One or more non-transitory computer-readable media storing instructions, wherein the instructions include:
   instructions, which, when executed by one or more hardware processors, cause executing a query execution plan, said query execution plan including a first aggregation operator and a second aggregation operator that is a record source for said first aggregation operator, wherein said first aggregation operator and said second aggregation operator perform a same aggregation operation;
   wherein executing the second aggregation operator comprises:
      generating an initial version of a batch of aggregation records based on a first set of records from an input source;
      determining that one or more second records from the input source may not be aggregated with any existing aggregation record of said batch of aggregation records, and in response, sending the one or more second records to said first aggregation operator without updating said batch of aggregation records; and sending the batch of aggregation records to the first aggregation operator;

wherein executing the first aggregation operator comprises aggregating aggregation records and second records received from the second aggregation operator.

14. The one or more non-transitory computer-readable media of claim 13, wherein the executing of the second aggregation operator further comprises:

monitoring a number of records reduced by aggregating with said batch of aggregation records;

determining that said number of records reduced is under a performance threshold;

flushing the batch of aggregation records by sending the batch of aggregation records to said first aggregation operator; and generating a refreshed version of said batch of aggregation records based on another set of records from the input source.

15. The one or more non-transitory computer-readable media of claim 14, wherein said number of records reduced is calculated as an average over time.

16. The one or more non-transitory computer-readable media of claim 14, wherein the executing of the second aggregation operator further comprises:

monitoring a number of successive occurrences of said flushing; and disabling aggregation at said second aggregation operator in response to said number of successive occurrences exceeding a set number.

17. The one or more non-transitory computer-readable media of claim 14, wherein flushing the batch of aggregation records comprises reserving a portion of said batch of aggregation records, and wherein said generating of said refreshed version of said batch of aggregation records preserves said portion.

18. The one or more non-transitory computer-readable media of claim 13, wherein said first aggregation operator is performed by a first plurality of computing devices, and wherein said second aggregation operator is performed by a second plurality of computing devices.

19. A database system comprising:

one or more computer-readable media storing instructions comprising a query execution plan including a first aggregation operator and a second aggregation operator that is a record source for said first aggregation operator, wherein said first aggregation operator and said second aggregation operator perform a same aggregation operation;

a first plurality of computing devices executing the first aggregation operator;

a second plurality of computing devices executing the second aggregation operator, wherein executing the second aggregation operator comprises:

generating an initial version of a batch of aggregation records based on a first set of records from an input source;

determining that one or more second records from the input source may not be aggregated with any existing aggregation record of said batch of aggregation records, and in response, sending the one or more second records to said first aggregation operator over a network without updating said batch of aggregation records; and sending the batch of aggregation records to the first aggregation operator;

wherein executing the first aggregation operator comprises aggregating aggregation records and second records received from the second aggregation operator.

20. The database system of claim 19 further comprising a database storage subsystem, wherein said first plurality of computing devices are database servers, and wherein said second plurality of computing devices are database servers in communication with said database storage subsystem, wherein the input source comprises a database object stored in the database storage subsystem.

* * * * *

UNITED STATES PATENT AND TRADEMARK OFFICE
CERTIFICATE OF CORRECTION

PATENT NO. : 9,460,154 B2  
APPLICATION NO. : 13/705004  
DATED : October 4, 2016  
INVENTOR(S) : Bellamkonda et al.

It is certified that error appears in the above-identified patent and that said Letters Patent is hereby corrected as shown below:

In the Specification

In Column 8, Line 24, delete "Discussing The" and insert -- discussing the --, therefor.

Signed and Sealed this  
Thirteenth Day of June, 2017

Joseph Matal  
*Performing the Functions and Duties of the*  
*Under Secretary of Commerce for Intellectual Property and*  
*Director of the United States Patent and Trademark Office*